United States
Tsuji

4,105,291
Aug. 8, 1978

[54] LARGE APERTURE ZOOM LENS

[75] Inventor: Sadahiko Tsuji, Yokohama, Japan

[73] Assignee: Canon Kabushiki Kaisha, Tokyo, Japan

[21] Appl. No.: 655,542

[22] Filed: Feb. 5, 1976

[30] Foreign Application Priority Data

Feb. 26, 1975 [JP] Japan .................................. 50-24317

[51] Int. Cl.² ............................................. G02B 15/18
[52] U.S. Cl. ..................................... 350/184; 350/176
[58] Field of Search ....................... 350/184, 176, 186

[56] References Cited
U.S. PATENT DOCUMENTS

| | | | |
|---|---|---|---|
| 2,937,572 | 5/1960 | Yamaji | 350/184 |
| 3,045,546 | 7/1962 | Cook | 350/186 |
| 3,524,696 | 8/1970 | Higuchi | 350/184 |
| 3,912,376 | 10/1975 | Ogura et al. | 350/186 |
| 3,937,562 | 2/1976 | Muszumanski et al. | 350/184 |

*Primary Examiner*—Paul A. Sacher
*Attorney, Agent, or Firm*—Toren, McGeady and Stanger

[57] ABSTRACT

The present invention relates to a zoom lens comprising four groups, the first group from the side of the object to be photographed presenting a positive refraction power, consisting of a positive compound lens of a negative and a positive lens and of a positive lens seen from the side of the object to be photographed and movable at the time of focussing, the second group presenting a negative refracting power and movable largely forth and back at the time of zooming, the third group presenting a positive refraction power and movable to and from in functional engagement with the second group at the time of zooming, whereby the first, the second and the third group almost composing an afocal system, and the fourth group presenting a positive refraction power and the image forming effect and consisting two positive lenses, a negative lens, a positive lens and a positive compound lens of a positive and a negative lens.

2 Claims, 40 Drawing Figures

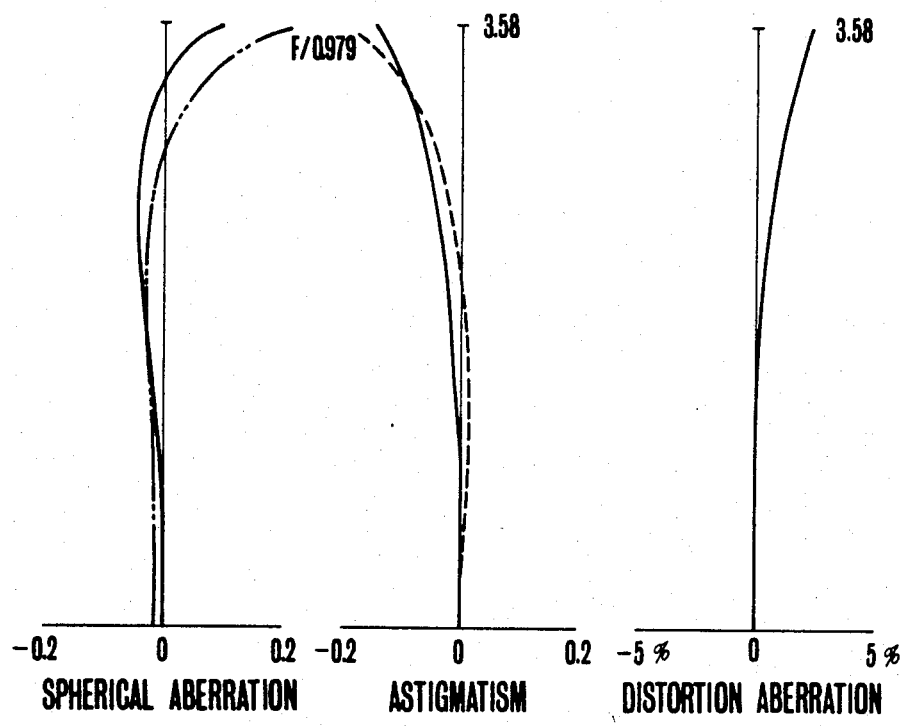

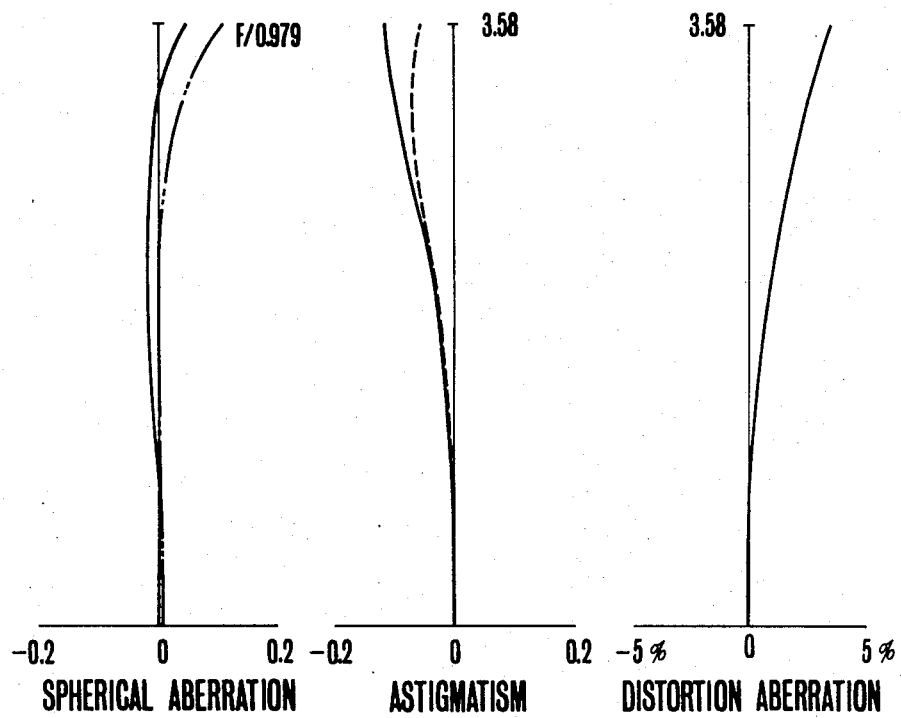

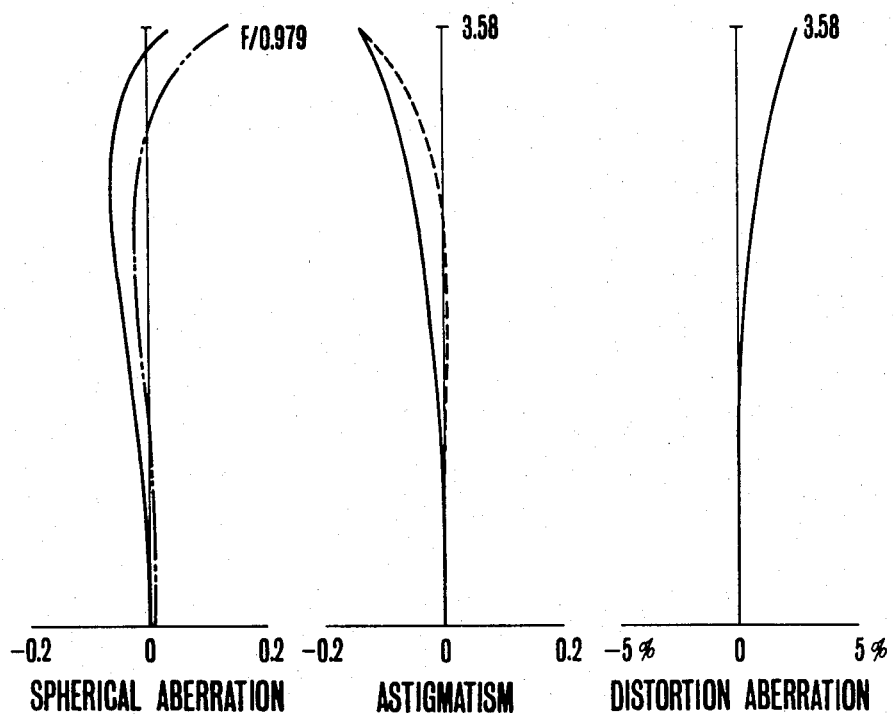

LARGE APERTURE ZOOM LENS

BACKGROUND OF THE INVENTION

The present invention relates to a compact zoom lens with remarkably large aperture for a motion picture camera, until now a zoom lens with F-No. about 1.2 and the zoom ratio of about 3 is already known.

SUMMARY OF THE INVENTION

The purpose of the present invention is to offer a zoom lens with zoom ratio of about 3 and F-No. smaller than 1.0, whereby the maximum diameter of the diaphragm is kept as small as possible in order to make the size of the motion picture camera compact while the aberrations are well compensated although the total length and the diameter of the front lens are remarkably small.

Below the composition of the present invention will be explained. The present lens system consists of four groups. The first group facing the object to be photographed exhibits a positive refraction power and a positive compound lens composed of a negative and a positive lens and a positive lens, and is advanced and retired at the time of focussing. The rear positive lens of the above mentioned compound lens is a single positive meniscus lens convex toward the object in the embodiments.

The second group is a lens group with the negative refraction power mainly for variating the magnification factor, for example in case of the embodiment consisting of a single negative lens and a negative compound lens of a negative and a positive lens and being movable largely along the optical axis for variating the magnification factor.

The third group is a lens group with a positive refraction power presenting a focal point adjusting effect, in case of the embodiment consisting of a single positive lens and being movable to and from in functional engagement with the second group at the time of zooming.

The first to the third group forms a substantially afocal system, while the fourth group presents the image forming effect, consisting of a single positive lens, a single positive lens, a single negative lens, a single positive lens and a compound positive lens of a positive and a negative lens or a single positive lens and a single negative lens positioned with a small air gap between them.

BRIEF DESCRIPTION OF THE DRAWINGS

FIGS. 6A, 6B and 6C respectively show a diagram of the aberration at the medium position of the embodiment 1.

FIGS. 10A, 10B and 10C respectively show a diagram of the aberration at the wide angle side of the embodiment 2.

FIGS. 12A, 12B and 12C respectively show a diagram of the aberration at the medium position of the embodiment 3.

DESCRIPTION OF THE PREFERRED EMBODIMENTS

Figure 1:
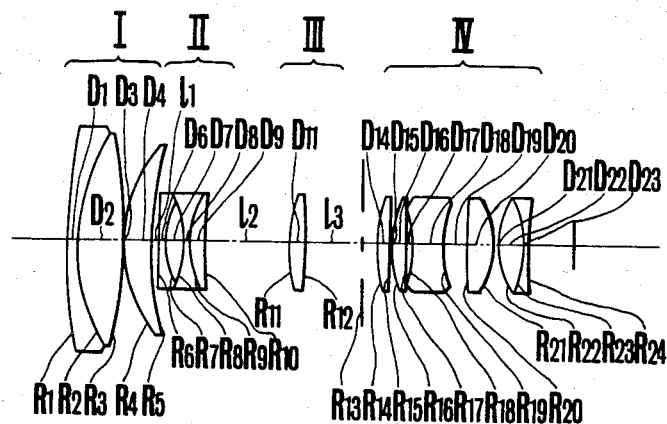
FIGS. 1, 2, 3 and 4 respectively show an embodiment of the lens in accordance with the present invention in section.

In FIGS. 1, 2, 3 and 4, I is the first positive group, II the second negative group, III the third positive group, IV the fourth positive group and $R_{13}$ a diaphragm.

The first group I consists of a positive lens consisting of a negative meniscus lens and a biconvex lens cemented to each other and a positive meniscus lens. The second group consists of a negative lens and a negative lens consisting of a biconcave lens and a positive meniscus lens cemented to each other. The third group consists of a biconvex lens. The fourth group, seen from the left, consists of two positive lenses, a biconcave lens, a biconvex lens and a compound positive lens consisting of a biconvex lens and a biconcave lens cemented to each other or placed with a small space between them.

Hereby the present zoom lens meets the following conditions (1) to (14).

(1) $|R_1| > |R_3|$
(2) $1.2F_I > R_2 > 0.8F_I$
(3) $0.8F_I > R_4 \, 0.5F_I$ $$-\frac{1}{40F_{II}} > \frac{1}{R_6} > \frac{1}{8F_{II}} \qquad (4)$$

(5) $3.0F_{IV} > R_{14} > 2.0F_{IV}$
(6) $|R_{14}| > |R_{16}|$
(7) $1.5F_{IV} > R_{19} > 1.0F_{IV}$
(8) $|R_{20}| > |R_{21}|$
(9) $1.1F_{IV} > R_{22} > 0.9F_{IV}$
(10) $2.2F_{IV} > |R_{23}| > 1.5F_{IV}$
(11) $0.4F_{IV} > D_{19} > 0.2F_{IV}$
(12) $1.85 > N_{15}, N_{17}, N_{21}, N_{23} > 1.65$
(13) $60 > V_{15}, V_{17}, V_{21}, V_{23} > 40$
(14) $30 > V_{19}, V_{24} > 22$ (In the embodiment 2, $V_{25}$)

Hereby $F_I$, $F_{II}$ and $F_{IV}$ are respectively the focal distance of the first group, the second group and the fourth group, while $R_1$, $R_2$ and $R_3$ the positive lens surfaces of the first group, $R_4$ the first surface of the second positive lens in the first group, $R_{14}$, $R_{16}$, $R_{19}$, $R_{20}$, $R_{21}$, $R_{22}$ and $R_{23}$ respectively the lens surfaces counted from the first surface of the fourth group, whereby the first surface is taken as $R_{14}$. $n_{15}$, $n_{17}$, $n_{21}$ and $n_{23}$ are respectively the indexes of refraction of the lenses counted from the first lens of the fourth group, whereby the index of refraction of the first lens is taken $n_{15}$. $V_{15}$, $V_{17}$, $V_{19}$, $V_{21}$, $V_{23}$ and $V_{24}$ the Abbe's numbers of the lenses counted from the first lens of the fourth group, whereby the Abbe's number of the first lens is taken $V_{15}$. $D_{19}$ is the distance between the negative lens and the second positive lens in the fourth group.

Below the conditions will be explained.

The condition (1) is for improving the compensation of the spherical aberration due to the zooming, whereby when this condition is not satisfied, such a large aperture ratio as F : 1.0 is not applicable. The condition (2) is that for the achromatism of the first group, whereby beyond the upper limit there takes place a shortage of the achromatism while beyond the lower limit there takes place the over-achromatism in such a manner that the variation of the chromatic aberration due to the zooming can not be compensated. The condition (3) is for compensating the variation of the astigmatism due to the zooming, whereby beyond the upper limit there takes place a shortage of the compensation of the astigmatism at the largest focal distance, while beyond the lower limit the radius of curvature relative to the diameter of the lens is too small to manufacture a lens with such a large aperture ratio as F : 1.0. The condition (4) relates to the variation of the aberrations of distortion and coma, whereby beyond the upper limit the variation of coma is remarkable while beyond the lower limit the variation of the aberration of distortion becomes large although that of the aberration of coma becomes small. The condition (5) is for compensating the spherical aberration, whereby beyond the lower limit the spherical aberration can not be compensated while beyond the upper limit the spherical aberration becomes small, and the compensating effect of the spherical aberration and the astigmatism by means of $R_{19}$ is decreased so that the astigmatism of the whole system becomes remarkable. The condition (6) is for equalizing the amounts of the spherical aberrations by $R_{14}$ and $R_{16}$, because the light beam on the axis refracted by $R_{14}$ enters into $R_{16}$, whereby due to this condition the spherical aberration of the whole system is kept satisfactory. The condition (7) relates to the balance between the spherical aberration and the astigmatism, whereby beyond the upper limit there takes place an under-compensation while beyond the lower limit there takes place an overcompensation. The conditions (8) and (9) are for keeping the aberration of distortion of the whole system moderate, whereby beyond the upper limit the distortion is of pincushion type while beyond the lower limit the distortion is of barrel type. The condition (10) relates to the compensation of the chromatic aberration, especially due to the magnification factor of the whole system, whereby beyond the upper limit there takes place an under-compensation while beyond the lower limit there takes place an over-compensation.

The condition (11) relates to the aberration of coma and the diameter of the rear lens whereby beyond the upper limit the diameter of the rear lens is increased which is not profitable as mechanical conditions while beyond the lower limit the aberration of coma becomes remarkable. The condition (12) shows that each of $N_{15}$, $N_{17}$, $N_{21}$ and $N_{23}$ is larger than 1.65, but smaller than 1.85. The refraction index of each lens is for keeping the Petzval sum as small as possible, whereby beyond the lower limit the Petzval sum becomes so large that in case of a lens with such a large aperture ratio as F : 1.0 the efficiency of the image near the circumference of the picture is remarkably decreased while the upper limit is the limit of the glass material obtainable within the range of the condition (13). The conditions (13, 14) are for compensating the chromatic aberration of the fourth group efficiently, whereby beyond the lower limit of the condition (13) and the upper limit of the condition (14) there takes place the shortage of the compensation of the achromatic aberration. Hereby the upper limit of the condition (13) is the limit of the glass material obtainable within the range of the condition (12) while the lower limit of the condition (14) is also the limit of the glass material obtainable disregarding the index of refraction.

Further it goes without saying that even if the compound lenses in the first and the second groups are placed with a small air gap between them the same aberration compensation effect can be obtained and further even if the afocal system of the first to the third group is a little disturbed the equivalent effect is brought to the aberration of the whole system.

Figure 2:
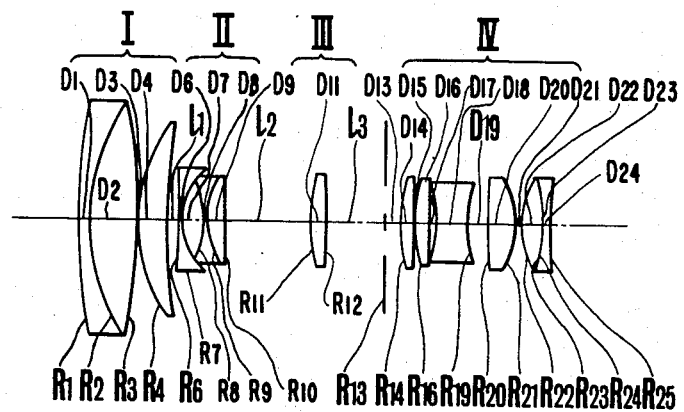
Figure 3:
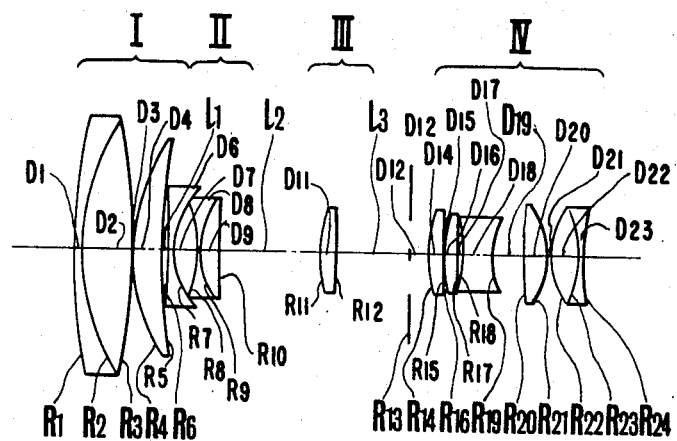
Figure 4:
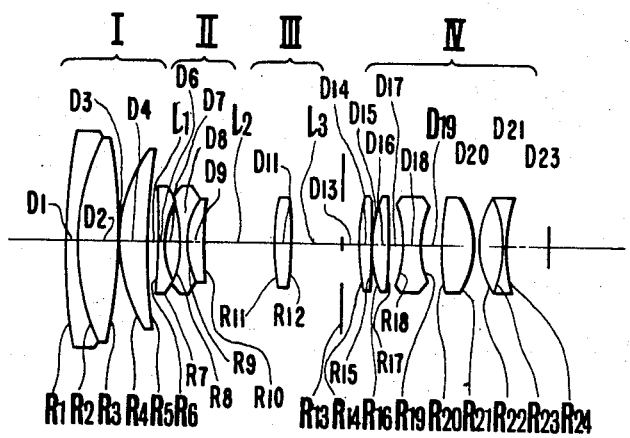
Figures 5A, 5B, 5C:
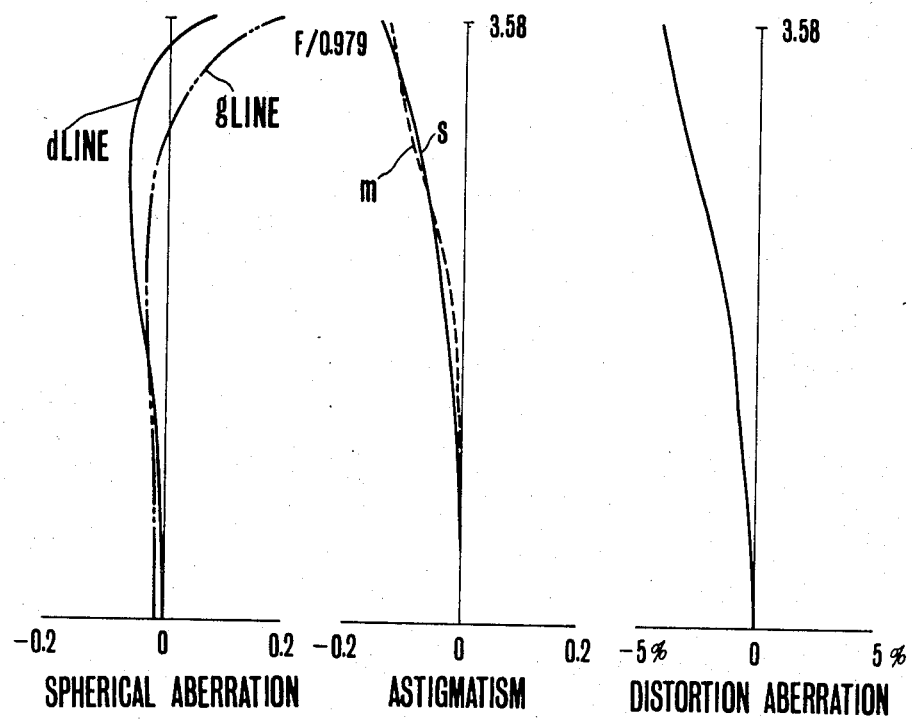
FIGS. 5A, 5B and 5C respectively show a diagram of the aberration at the telescopic side of the embodiment 1.
Figures 7A, 7B, 7C:
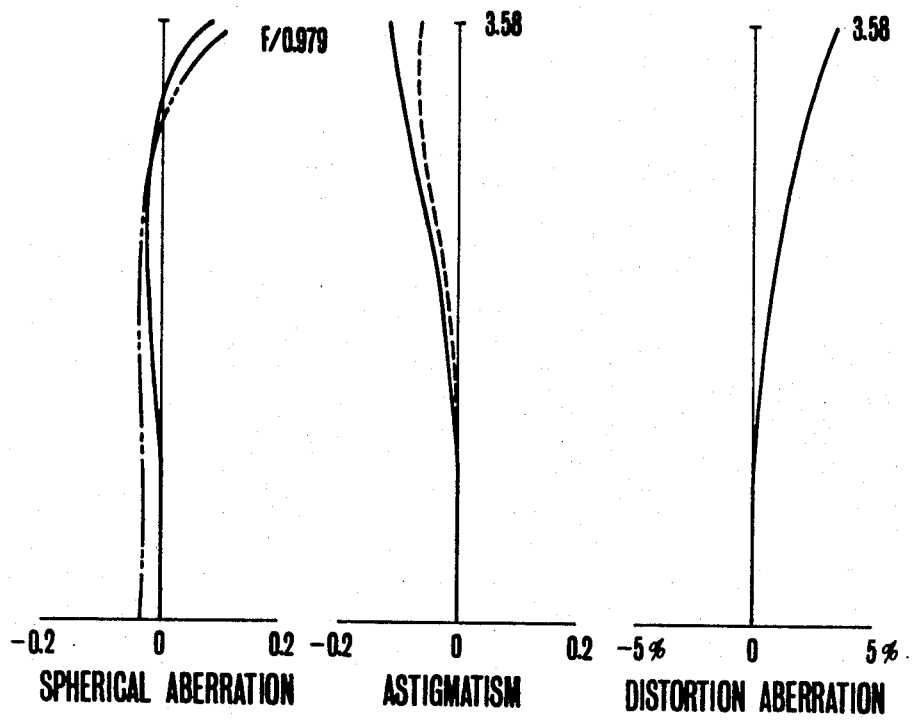
FIGS. 7A, 7B and 7C respectively show a diagram of the aberration at the wide angle side of the embodiment 1.
Figures 8A, 8B, 8C:
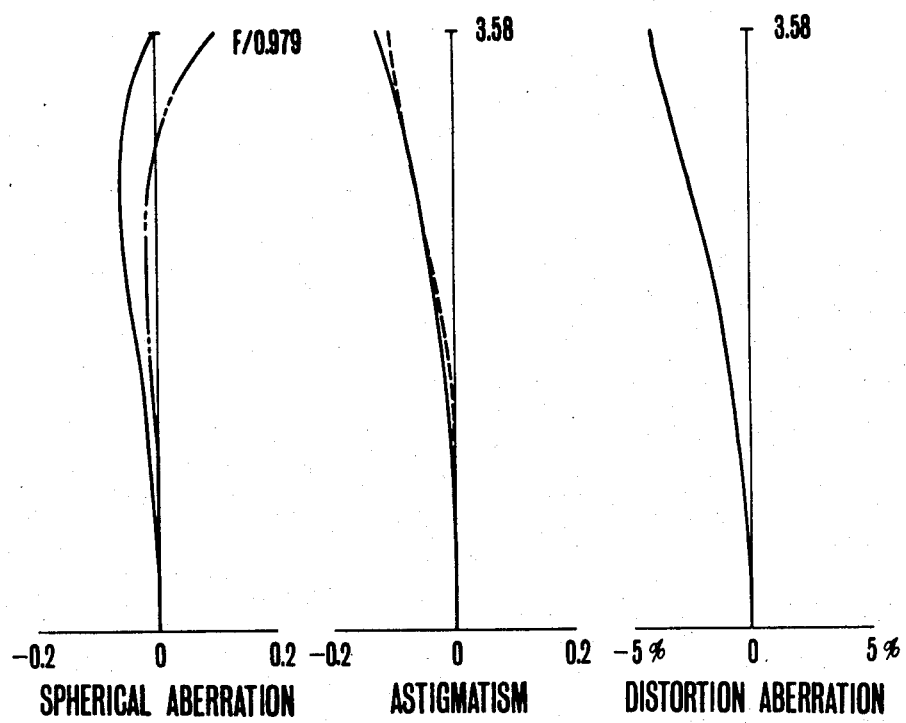
FIGS. 8A, 8B and 8C respectively show a diagram of the aberration at the telescopic side of the embodiment 2.
Figures 9A, 9B, 9C:
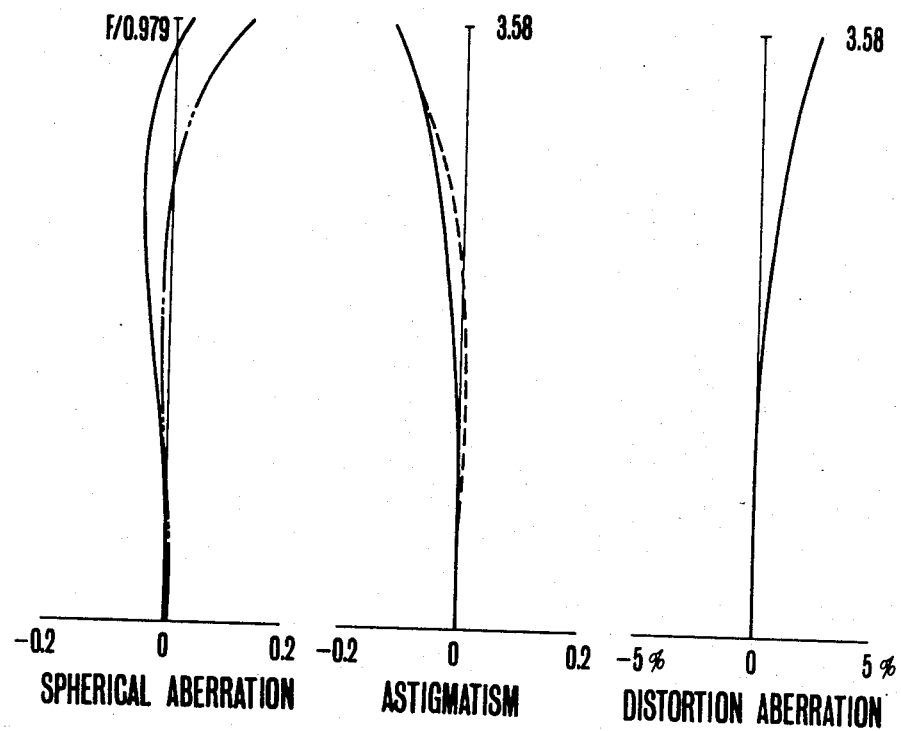
FIGS. 9A, 9B and 9C respectively show a diagram of the aberration at the medium position of the embodiment 2.
Figures 11A, 11B, 11C:
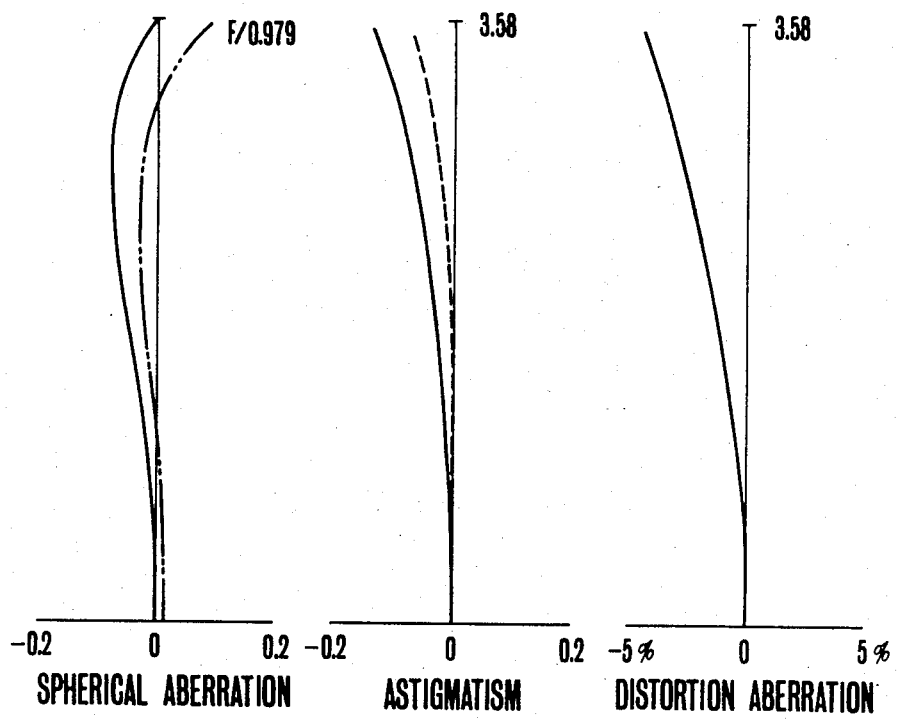
FIGS. 11A, 11B and 11C respectively show a diagram of the aberration at the telescopic side of the embodiment 3.
Figures 13A, 13B, 13C:
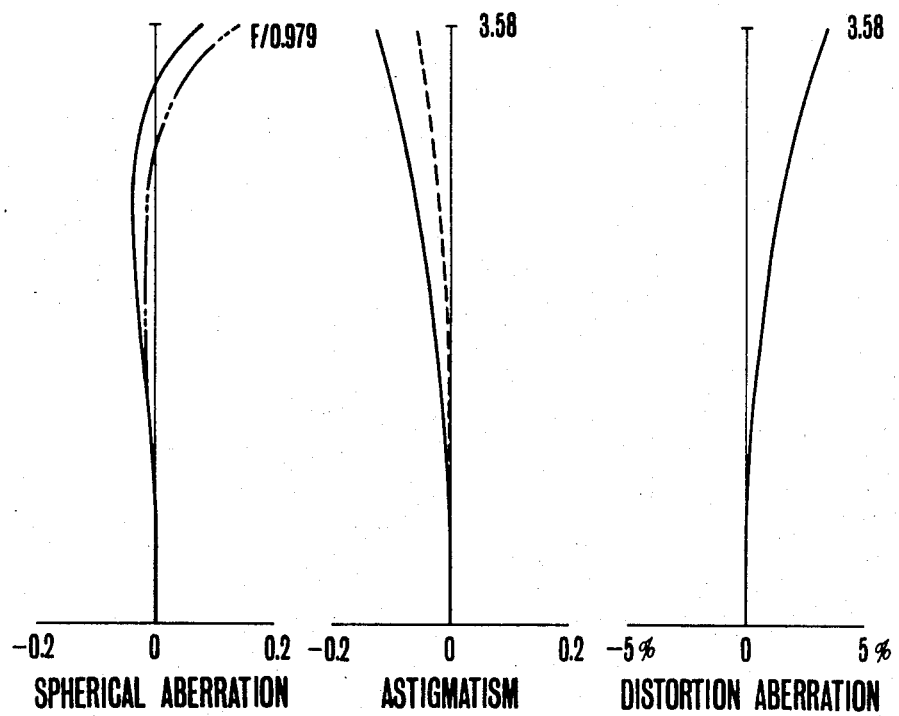
FIGS. 13A, 13B and 13C respectively show a diagram of the aberration at the wide angle side of the embodiment 3.
Figures 14A, 14B, 14C:
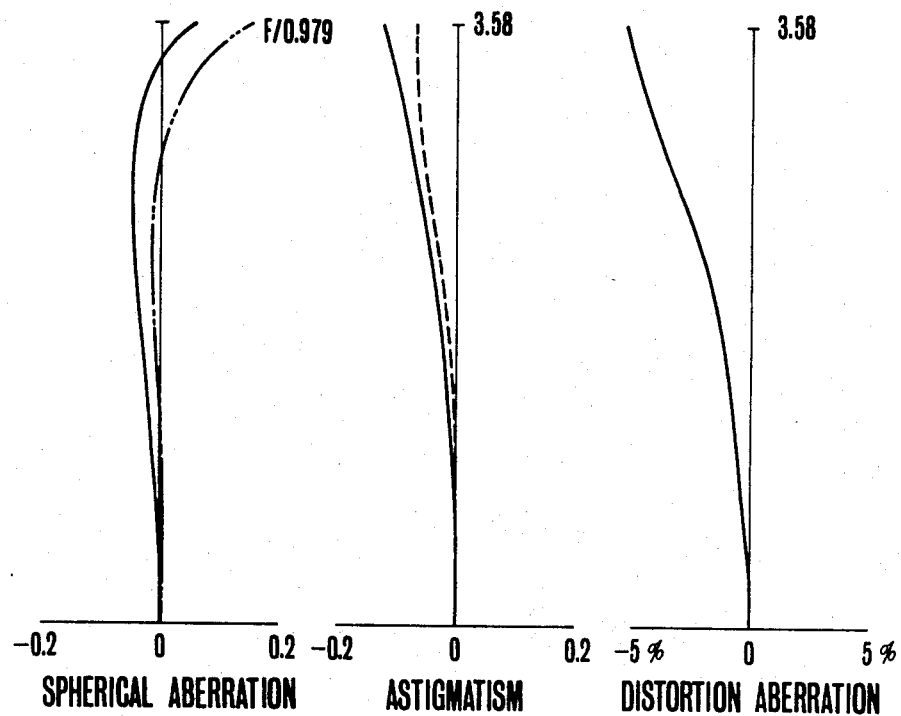
FIGS. 14A, 14B and 14C respectively show a diagram of the aberration at the telescopic side of the embodiment 4.
Figures 15A, 15B, 15C:
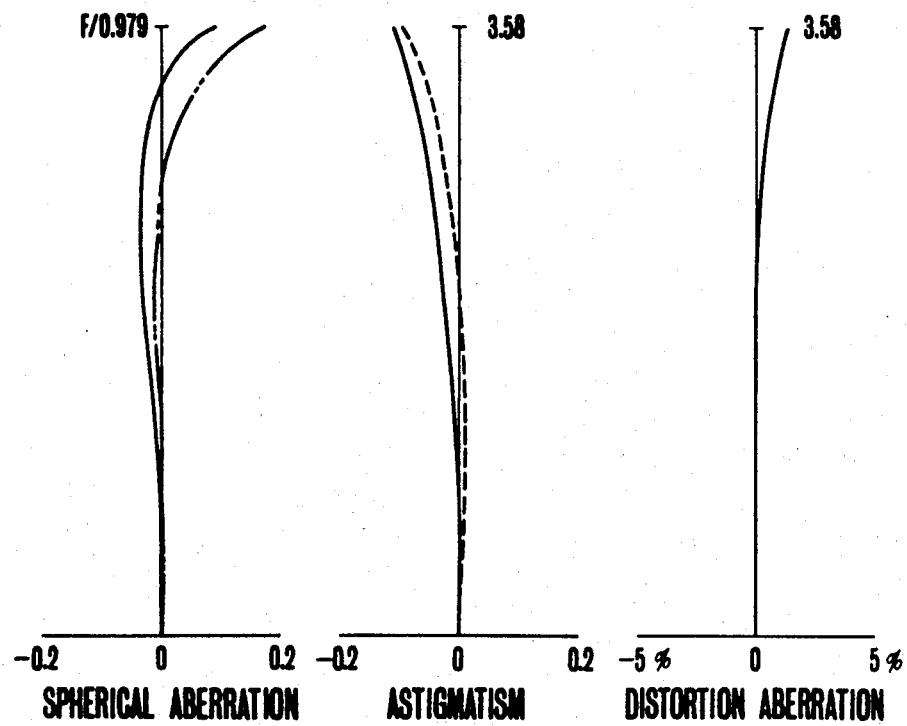
FIGS. 15A, 15B and 15C respectively show a diagram of the aberration at the medium position of the embodiment 4.
Figures 16A, 16B, 16C:
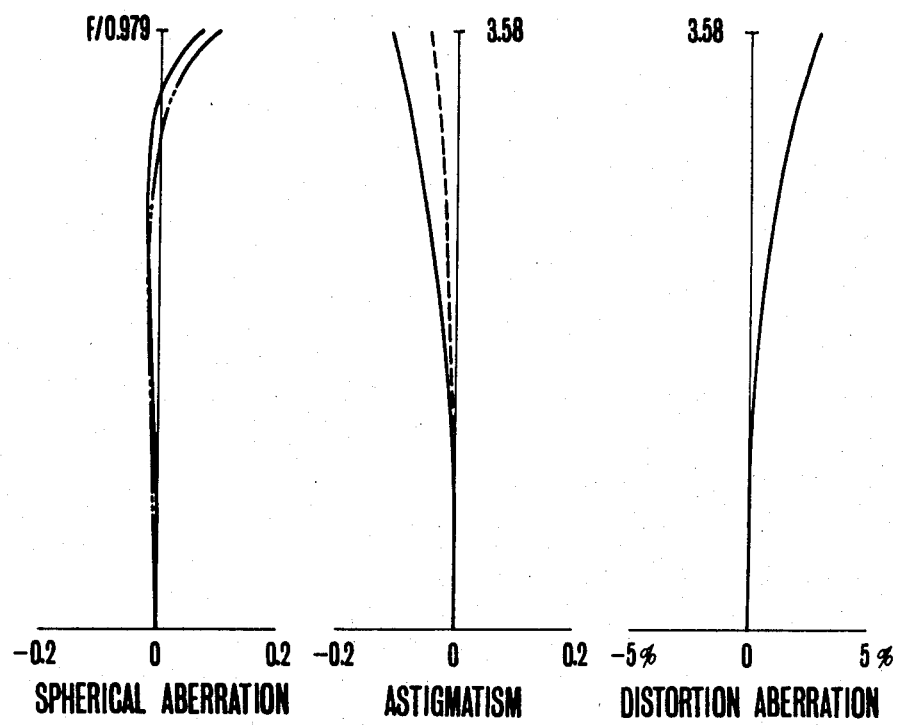
FIGS. 16A, 16B and 16C respectively show a diagram of the aberration at the wide angle side of the embodiment 4.

Below several embodiments will be given, whereby the embodiment 1 corresponds to FIG. 1, the embodiment 2 to FIG. 2, the embodiment 3 to FIG. 3 and the embodiment 4 to FIG. 4. Hereby R is the radius of lens surface, D the thickness of lens of the distance between lens surfaces, Nd the index of refraction, Vd the Abbe's number and $l$ the adjustable distance.

Embodiment 1:

| | f = 8.71863 − 24,81217 | | F.No. 1: 0.979 | Aperture: 13 |
|---|---|---|---|---|
| | R | D | Nd | Vd |
| 1 | 112.031 | 2.00 | 1. | |
| 2 | 37.259 | 7.52 | 1.8051 | 25.4 |
| 3 | −76.410 | 0.12 | 1.5891 | 61.1 |
| 4 | 25.085 | 4.51 | 1. | |
| 5 | 67.908 | $l_1$ | 1.6229 | 58.2 |
| 6 | −953.365 | 0.90 | 1. | |
| 7 | 11.473 | 3.20 | 1.5891 | 61.1 |
| 8 | −19.418 | 0.72 | 1. | |
| 9 | 14.172 | 2.69 | 1.5891 | 61.1 |
| 10 | 72.777 | $l_2$ | 1.8051 | 25.4 |
| 11 | 27.542 | 2.68 | 1. | |
| 12 | −107.516 | $l_3$ | 1.5891 | 61.1 |
| 13 | | 2.50 | 1. | |
| 14 | 33.893 | 2.24 | 1. | |
| 15 | −8678.084 | 0.10 | 1.7725 | 49.7 |
| 16 | 21.228 | 2.65 | 1. | |
| 17 | −317.316 | 1.13 | 1.7725 | 49.7 |
| 18 | −17.769 | 5.03 | 1. | |
| 19 | 17.058 | 3.86 | 1.8051 | 25.4 |
| 20 | 84.743 | 5.22 | 1. | |
| 21 | −15.369 | 0.07 | 1.7725 | 49.7 |
| 22 | 14.317 | 4.68 | 1. | |
| 23 | −21.145 | 0.60 | 1.7725 | 49.7 |
| 24 | 67.665 | 7.93 | 1.8051 | 25.4 |
| | Wide angle | Medium | Telescopic | |
| F = | 8.718 | 14.67 | 24.812 | |
| $l_1$ | 1.296 | 9.511 | 14.394 | |
| $l_2$ | 14.343 | 9.478 | 1.245 | |
| $l_3$ | 9.900 | 6.550 | 9.900 | |

$f_I = 39.52$
$f_{II} = -11.97$
$f_{III} = 37.49$
$f_{IV} = 13.95$

Embodiment 2:

| | f = 8.70759 − 24.81663, | | F.No. 1 : 1.006 | Aperture : 13 |
|---|---|---|---|---|
| | R | D | Nd | Vd |
| 1 | 103.693 | 2.00 | 1. | |
| 2 | 36.803 | 7.44 | 1.8051 | 25.4 |
| 3 | −90.863 | 0.12 | 1.5891 | 61.1 |
| 4 | 27.115 | 4.40 | 1. | |
| 5 | 96.972 | $l_1$ | 1.5891 | 61.1 |
| 6 | −921.159 | 0.90 | 1. | |

-continued

| | | | | |
|---|---|---|---|---|
| 7 | 11.497 | 3.38 | 1.6229 | 58.2 |
| 8 | −18.128 | 0.90 | 1. | |
| 9 | 15.291 | 2.63 | 1.5163 | 64.1 |
| 10 | 76.146 | $l_2$ | 1.8051 | 25.4 |
| 11 | 34.963 | 2.56 | 1. | |
| 12 | −69.154 | $l_3$ | 1.5891 | 61.1 |
| 13 | | 2.50 | 1. | |
| 14 | 31.099 | 2.27 | 1. | |
| 15 | 405.807 | 0.10 | 1.6935 | 53.3 |
| 16 | 23.775 | 2.73 | 1. | |
| 17 | −90.508 | 1.01 | 1.7725 | 49.7 |
| 18 | −18.182 | 5.04 | 1. | |
| 19 | 16.803 | 3.88 | 1.8051 | 25.4 |
| 20 | 67.616 | 4.89 | 1. | |
| 21 | −14.905 | 0.10 | 1.6935 | 53.3 |
| 22 | 13.890 | 4.90 | 1. | |
| 23 | −30.630 | 0.16 | 1.7725 | 49.7 |
| 24 | −28.867 | 0.80 | 1. | |
| 25 | 58.855 | | 1.8051 | 25.4 |
| | | | 1. | |
| F = 8.707 | | 14.697 | 24.816 | |
| $l_1$ = 1.791 | | 10.462 | 15.599 | |
| $l_2$ = 15.056 | | 9.920 | 1.249 | |
| $l_3$ = 10.134 | | 6.500 | 10.134 | |

$f_I$ 41.37
$f_{II}$ −12.60
$f_{III}$ 39.78
$f_{IV}$ 14.15

Embodiment 3:

f = 8.51186 − 24.22375, F.No. 1 : 1.0, Aperture: 13

| | R | D | Nd | Vd |
|---|---|---|---|---|
| 1 | 122.615 | 1.50 | 1 | |
| 2 | 41.239 | 8.09 | 1.7552 | 27.5 |
| 3 | −105.227 | 0.15 | 1.5891 | 61.1 |
| 4 | 31.720 | 4.90 | 1. | |
| 5 | 103.332 | $l_1$ | 1.5891 | 61.1 |
| 6 | −1685.956 | 0.90 | 1. | |
| 7 | 14.518 | 3.69 | 1.5891 | 61.1 |
| 8 | −27.172 | 0.90 | 1. | |
| 9 | 17.613 | 2.64 | 1.5891 | 61.1 |
| 10 | 65.988 | $l_2$ | 1.8051 | 25.4 |
| 11 | 32.001 | 2.68 | 1. | |
| 12 | −163.107 | $l_3$ | 1.5891 | 61.1 |
| 13 | | 3.50 | 1. | |
| 14 | 29.092 | 2.21 | 1. | |
| 15 | 1637.390 | 0.10 | 1.7725 | 49.7 |
| 16 | 24.093 | 2.40 | 1. | |
| 17 | −128.013 | 0.83 | 1.7725 | 49.7 |
| 18 | −19.883 | 5.02 | 1. | |
| 19 | 13.981 | 5.03 | 1.8051 | 25.4 |
| 20 | 51.316 | 4.40 | 1. | |
| 21 | −15.990 | 0.06 | 1.7725 | 49.7 |
| 22 | 14.198 | 4.79 | 1. | |
| 23 | −27.792 | 0.60 | 1.7725 | 49.7 |
| 24 | 51.290 | | 1.8051 | 25.4 |
| | | 1. | | |
| F = | 8.511 | 14.340 | 24.223 | |
| $l_1$ = | 1.235 | 11.504 | 17.608 | |
| $l_2$ = | 17.567 | 11.485 | 1.194 | |
| $l_3$ = | 12.700 | 8.513 | 12.700 | |

$f_I$ = 48.16
$f_{II}$ = −14.96
$f_{III}$ = 45.61
$f_{IV}$ = 13.60

Embodiment 4:

f = 8.71539 − 20.69907, F.No. 1 : 0.98, Aperture : 13

| | R | D | Nd | Vd |
|---|---|---|---|---|
| 1 | 97.596 | 1.75 | 1. | |
| 2 | 36.499 | 7.23 | 1.8051 | 25.4 |
| 3 | −89.454 | 0.15 | 1.5891 | 61.1 |
| 4 | 25.412 | 4.79 | 1. | |
| 5 | 100.536 | $l_1$ | 1.5891 | 61.1 |
| 6 | −165.989 | 0.90 | 1. | |
| 7 | 11.234 | 3.36 | 1.5891 | 61.1 |
| 8 | −19.499 | 0.90 | 1. | |
| 9 | 13.673 | 2.60 | 1.5163 | 64.1 |
| 10 | 48.356 | $l_2$ | 1.8051 | 25.4 |
| 11 | 32.860 | 2.81 | 1. | |
| 12 | −59.851 | $l_3$ | 1.5891 | 61.1 |
| 13 | | 2.50 | 1. | |
| 14 | 31.921 | 2.20 | 1. | |
| 15 | −456.437 | 0.10 | 1.7725 | 49.7 |
| 16 | 22.437 | 2.52 | 1. | |
| 17 | −97.462 | 0.84 | 1.7725 | 49.7 |
| 18 | −17.034 | 4.61 | 1. | |
| 19 | 13.541 | 3.70 | 1.8051 | 25.4 |
| 20 | 45.087 | 5.81 | 1. | |
| 21 | −14.299 | 0.10 | 1.7725 | 49.7 |
| 22 | 13.193 | 4.59 | 1. | |
| 23 | −24.712 | 0.60 | 1.7725 | 49.7 |
| 24 | 38.649 | | 1.8051 | 25.4 |
| | | 1. | | |
| F = | 8.715 | 13.431 | 20.699 | |
| $l_1$ = | 1.442 | 7.919 | 12.122 | |
| $l_2$ = | 12.079 | 7.876 | 1.398 | |
| $l_3$ = | 8.000 | 6.525 | 8.800 | |

$f_I$ = 37.91
$f_{II}$ = −11.97
$f_{III}$ = 36.41
$f_{IV}$ = 12.90

What is claimed is:

1. A large aperture zoom lens comprising, from the direction of the object to be photographed, a first lens group for focusing and consisting of a positive compound lens having a negative meniscus lens and a biconvex lens and of a positive meniscus lens convex toward the object, a second lens group for variation and consisting of a negative lens and a negative compound lens having a biconcave lens and a positive lens, a third group for compensation consisting of a positive lens, said third group being movable to and fro for zooming, a fourth group for image forming and consisting of two positive lenses convex toward the object and a biconcave lens as well as a biconvex lens and a positive compound lens having a biconvex lens and a biconcave lens, said fourth group having the longest lens spacing between said biconcave lens and biconvex lens, said large aperture zoom lens satisfying the following conditions:

$|R_1| > |R_3|$
$|R_{14}| > |R_{16}|$
$|R_{20}| > |R_{21}|$
$2.2 F_{IV} > |R_{23}| > 1.5 F_{IV}$ wherein $F_{IV}$ is the focal length of the fourth lens group,
$R_1$ $R_3$ the radii of the outer surfaces of the positive compound lens in the first lens group,
$R_{14}$ and $R_{16}$, the radii of the surfaces facing the object in the positive lenses of the fourth lens group,
$R_{20}$ and $R_{21}$, the radii of the surfaces of the biconvex lens in the fourth lens group.

2. A large aperture zoom lens in accordance with claim 1, in which a fine space is provided between the biconvex lens and the biconcave lens forming said positive compound lens of the fourth group.

* * * * *